United States Patent
Bussear

(10) Patent No.: US 8,857,785 B2
(45) Date of Patent: Oct. 14, 2014

(54) THERMO-HYDRAULICALLY ACTUATED PROCESS CONTROL VALVE

(75) Inventor: Terry R. Bussear, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 618 days.

(21) Appl. No.: 13/033,297

(22) Filed: Feb. 23, 2011

(65) Prior Publication Data

US 2012/0211680 A1 Aug. 23, 2012

(51) Int. Cl.
*F16K 31/68* (2006.01)
*E21B 23/00* (2006.01)
*E21B 34/00* (2006.01)
*F16K 31/02* (2006.01)

(52) U.S. Cl.
CPC .................................. *F16K 31/025* (2013.01)
USPC ................................ 251/11; 251/63; 166/66.7

(58) Field of Classification Search
USPC ................ 251/11, 62, 63, 63.4, 63.5, 63.6; 166/66.7
See application file for complete search history.

(56) References Cited

U.S. PATENT DOCUMENTS

| | | | |
|---|---|---|---|
| 3,335,997 A | | 8/1967 | Sherwood |
| 3,721,421 A | * | 3/1973 | Cliff ................................. 251/11 |
| 3,760,832 A | * | 9/1973 | McGowen et al. ............ 137/155 |
| 3,778,021 A | * | 12/1973 | Alexander et al. .............. 251/11 |
| 4,072,159 A | * | 2/1978 | Kurosawa ........................ 137/67 |
| 4,258,899 A | * | 3/1981 | Huelle et al. .................... 251/11 |
| 4,619,320 A | * | 10/1986 | Adnyana et al. ............. 166/66.7 |
| 4,884,780 A | | 12/1989 | Ohashi |
| 4,923,012 A | | 5/1990 | Hopmann |
| 5,343,955 A | | 9/1994 | Williams |
| 5,496,044 A | | 3/1996 | Beall et al. |
| 5,682,921 A | | 11/1997 | Rawson et al. |
| 5,740,864 A | | 4/1998 | de Hoedt et al. |
| 5,799,949 A | | 9/1998 | Beall et al. |
| 5,918,858 A | | 7/1999 | Rawson et al. |
| 6,173,785 B1 | | 1/2001 | Adams et al. |
| 6,199,629 B1 | | 3/2001 | Shirk et al. |
| 6,237,683 B1 | * | 5/2001 | Pringle et al. ................... 166/66 |
| 6,253,843 B1 | | 7/2001 | Rawson et al. |
| 6,260,850 B1 | | 7/2001 | Beall et al. |
| 6,283,477 B1 | | 9/2001 | Beall et al. |

(Continued)

FOREIGN PATENT DOCUMENTS

DE 10027379 A1 12/2001

OTHER PUBLICATIONS

Leboeuf, Gerald, Case History: New Design in Surface-Controlled Subsurface Safety Valves Resolves Valve Problems in Subsea Completions in the Gulf of Mexico, Offshore Technology Conference, May 5-8, 2008, pp. 1-9, Houston TX.

*Primary Examiner* — John K Fristoe, Jr.
*Assistant Examiner* — Jonathan Waddy
(74) *Attorney, Agent, or Firm* — Cantor Colburn LLP

(57) ABSTRACT

A thermo-hydraulically actuated valve including a housing; a closure member capable of preventing and permitting fluid flow through the housing. An actuation fluid chamber disposed at the housing and sealed from an external environment. A motive force transmitter in force transmissive communication with the closure member. The transmitter being in fluid communication with the actuation fluid chamber; and a heating element in thermal communication with the actuation fluid chamber. The valve being devoid of a dynamic seal between an area of the valve to be contacted by a managed fluid within the valve and an environment outside of the valve.

19 Claims, 5 Drawing Sheets

(56) References Cited

U.S. PATENT DOCUMENTS

| | | |
|---|---|---|
| 6,328,062 B1 | 12/2001 | Williams et al. |
| 6,427,778 B1 | 8/2002 | Beall et al. |
| 6,478,090 B2 * | 11/2002 | Deaton ............ 166/363 |
| 6,607,037 B2 | 8/2003 | Thompson |
| 6,619,388 B2 * | 9/2003 | Dietz et al. ............ 166/66.7 |
| 6,644,408 B2 | 11/2003 | Ives |
| 6,695,061 B2 * | 2/2004 | Fripp et al. ............ 166/373 |
| 6,848,509 B2 | 2/2005 | Myerley |
| 6,866,101 B2 | 3/2005 | Sloan |
| 6,877,564 B2 | 4/2005 | Layton et al. |
| 6,902,006 B2 | 6/2005 | Myerley et al. |
| 6,957,703 B2 | 10/2005 | Trott et al. |
| 7,000,698 B2 * | 2/2006 | Mayeu et al. ............ 166/66 |
| 7,048,059 B2 | 5/2006 | Adams et al. |
| 7,137,452 B2 | 11/2006 | McVicker |
| 7,204,313 B2 | 4/2007 | Williams et al. |
| 7,255,174 B2 | 8/2007 | Thompson |
| 7,347,268 B2 | 3/2008 | Layton |
| 7,347,269 B2 | 3/2008 | Layton |
| 7,367,405 B2 * | 5/2008 | Murray ............ 166/383 |
| 7,401,788 B2 | 7/2008 | Williams et al. |
| 7,409,996 B2 | 8/2008 | Myerley et al. |
| 7,493,956 B2 | 2/2009 | Shaw et al. |
| 7,552,774 B2 | 6/2009 | Anderson et al. |
| 7,591,317 B2 | 9/2009 | Bane et al. |
| 7,604,056 B2 | 10/2009 | Haynes |
| 7,621,327 B2 | 11/2009 | Bane |
| 7,637,324 B2 | 12/2009 | Anderson et al. |
| 7,650,945 B2 | 1/2010 | Brown |
| 7,665,518 B2 | 2/2010 | Bane et al. |
| 7,665,529 B2 | 2/2010 | Farquhar et al. |
| 7,669,661 B2 | 3/2010 | Johnson |
| 7,694,742 B2 | 4/2010 | Bane et al. |
| 7,699,108 B2 | 4/2010 | Bane et al. |
| 7,703,532 B2 | 4/2010 | O'Malley et al. |
| 7,708,075 B2 | 5/2010 | Lake et al. |
| 7,717,185 B2 | 5/2010 | Anderson et al. |
| 7,735,560 B2 | 6/2010 | Bane et al. |
| 7,743,833 B2 | 6/2010 | Cascario et al. |
| 7,762,335 B2 | 7/2010 | Anderson et al. |
| 7,779,907 B2 | 8/2010 | Wagner et al. |
| 7,810,571 B2 | 10/2010 | Beall |
| 2005/0000578 A1 | 1/2005 | Eberhardt et al. |
| 2005/0098210 A1 | 5/2005 | Strattan et al. |
| 2006/0157240 A1 | 7/2006 | Shaw et al. |
| 2007/0284118 A1 * | 12/2007 | Benton ............ 166/386 |
| 2008/0029264 A1 | 2/2008 | Williams et al. |
| 2008/0237993 A1 | 10/2008 | Bane et al. |
| 2008/0257548 A1 | 10/2008 | Shaw et al. |
| 2008/0314599 A1 | 12/2008 | Bane et al. |
| 2009/0020291 A1 | 1/2009 | Wagner et al. |
| 2009/0038804 A1 | 2/2009 | Going, III |
| 2009/0071654 A1 | 3/2009 | O'Malley et al. |
| 2009/0184278 A1 | 7/2009 | Beall et al. |
| 2009/0229814 A1 | 9/2009 | Going, III |
| 2009/0236099 A1 | 9/2009 | Burris et al. |
| 2009/0250206 A1 | 10/2009 | Lake et al. |
| 2010/0025045 A1 | 2/2010 | Lake et al. |
| 2010/0243077 A1 | 9/2010 | Grimseth et al. |
| 2010/0264346 A1 | 10/2010 | Bussear |

* cited by examiner

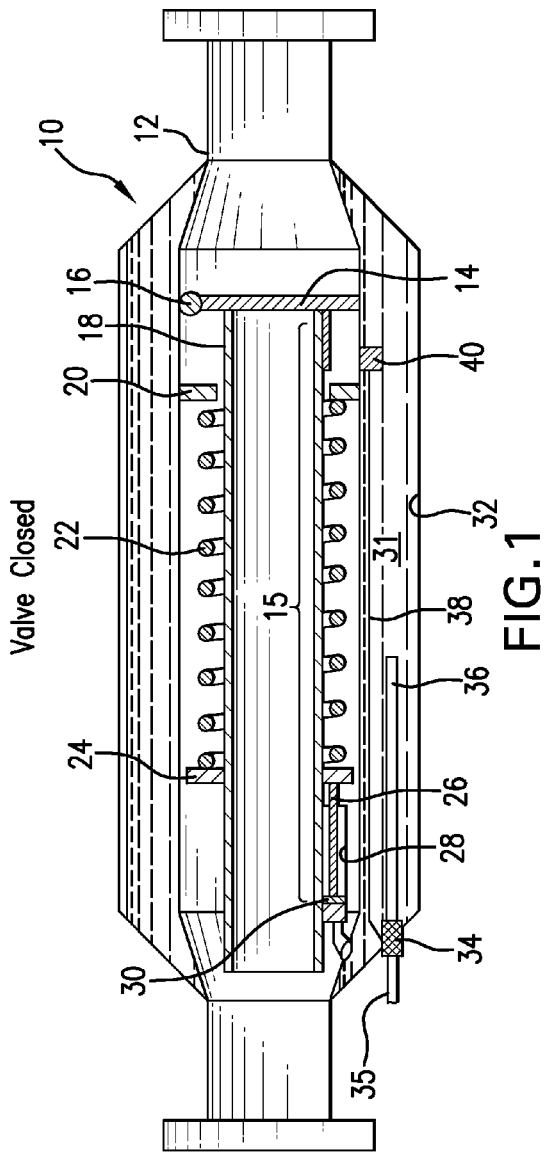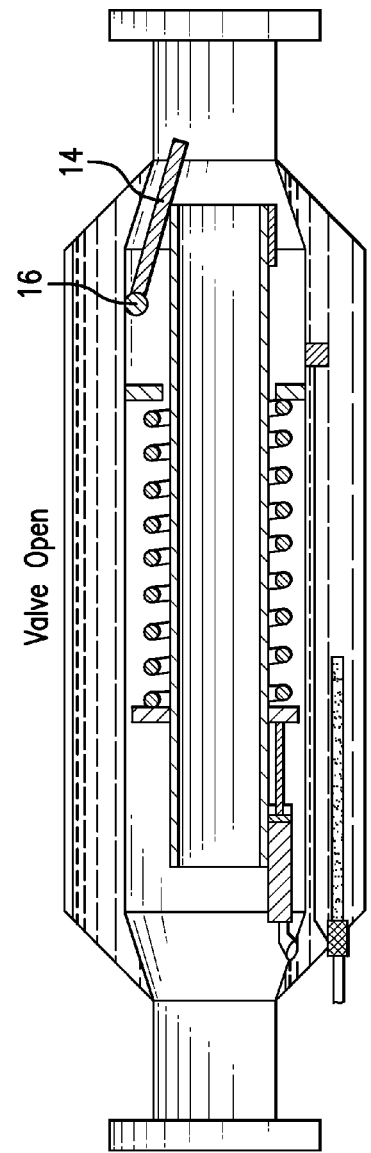

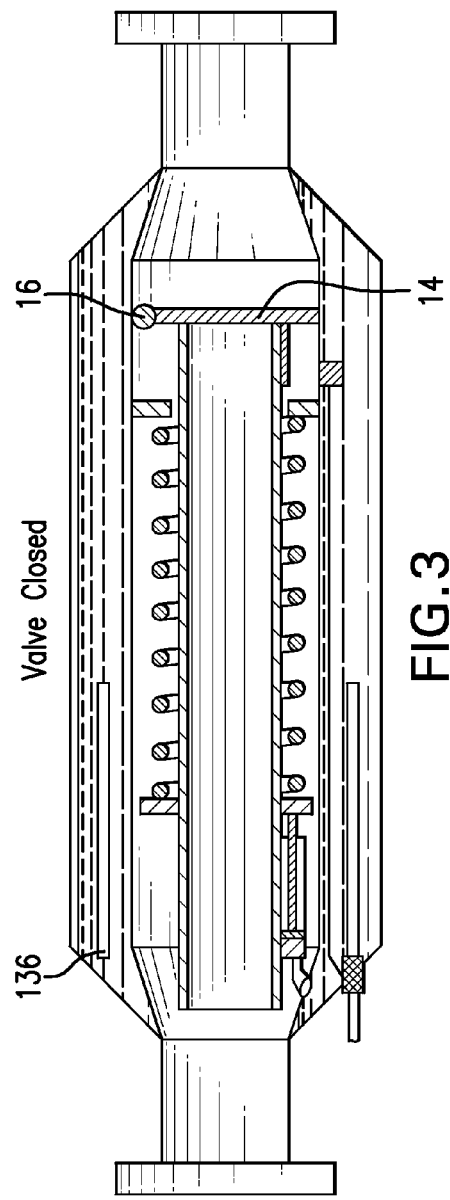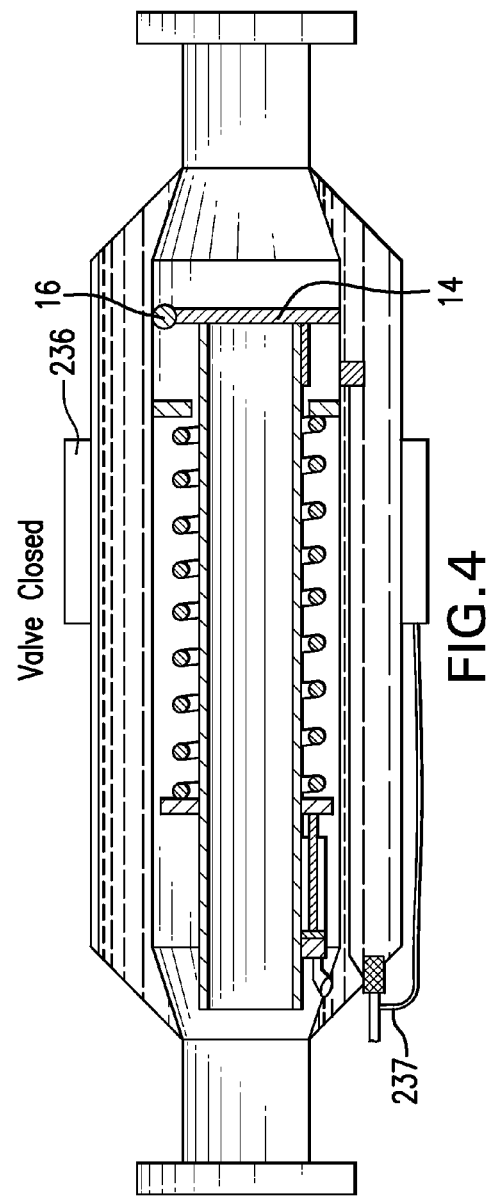

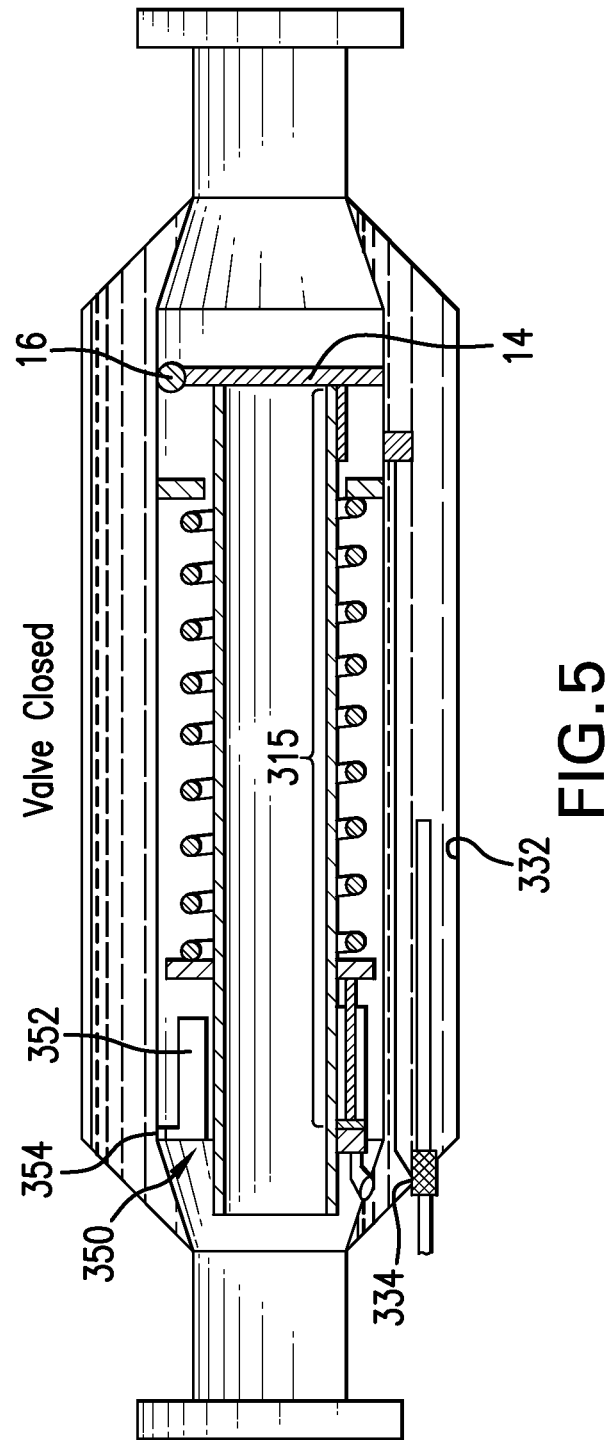

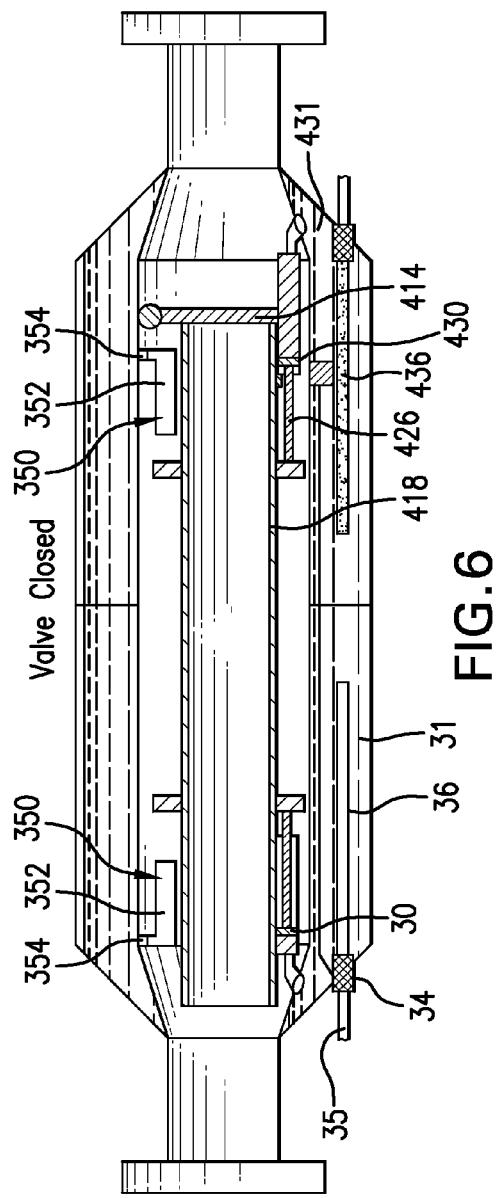
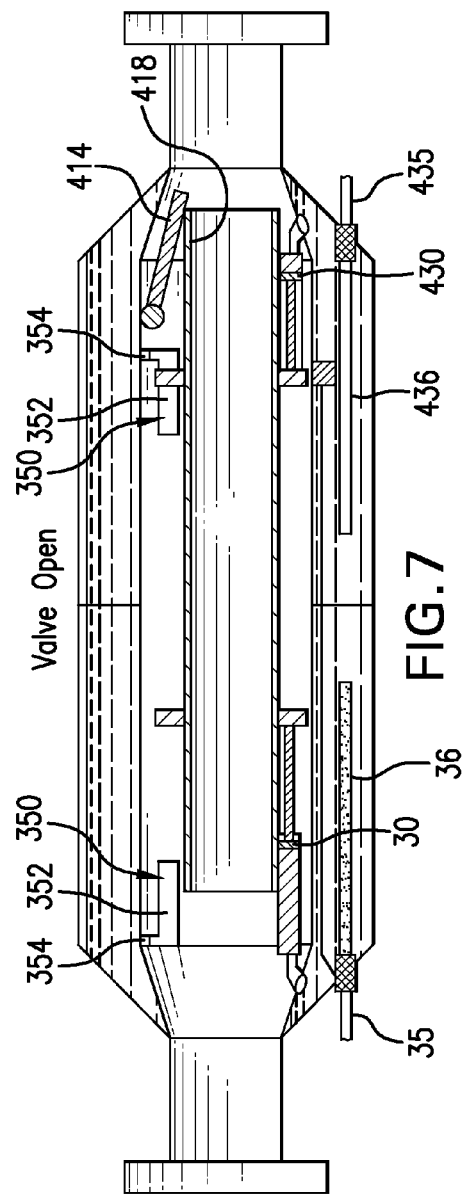

THERMO-HYDRAULICALLY ACTUATED PROCESS CONTROL VALVE

BACKGROUND

Process control valves are used in many industries to control fluid movement for a plethora of reasons. Some of the fluids controlled by such valves are difficult to handle such that their escape from the system is undesirable. Hydrogen Sulfide is one such fluid and will be recognized by those of skill in the art as a gas that one would prefer did not escape the system in which it is housed.

Traditional process control valves include an open or close lever that is mechanically actuated either manually or by mechanism. While such valves do control flow of the subject fluid, they also suffer from the fact that they contain a dynamic seal between the subject fluid and the environmental atmosphere. This dynamic seal exists about a shaft connected between the valve member itself and the lever. Since dynamic seals require periodic maintenance and represent a potential leak path for the subject fluid to reach environmental atmosphere and since as has been stated above it would be desirable to provide systems that more robustly contain the subject fluid within the system in which they are housed, the art would well receive alternate process control valves that improve confidence of containment.

SUMMARY

A thermo-hydraulically actuated valve including a housing; a closure member capable of preventing and permitting fluid flow through the housing; an actuation fluid chamber disposed at the housing and sealed from an external environment; a motive force transmitter in force transmissive communication with the closure member, the transmitter being in fluid communication with the actuation fluid chamber; and a heating element in thermal communication with the actuation fluid chamber, the valve being devoid of a dynamic seal between an area of the valve to be contacted by a managed fluid within the valve and an environment outside of the valve.

A thermo-hydraulically actuated valve including a housing devoid of a dynamic seal between a managed fluid area of the valve and an environment outside of the valve; a closure member in the housing; an actuation fluid in pressure communication with the closure member; and an element capable of causing a change in the pressure of the actuation fluid.

A thermo-hydraulically actuated valve including a housing devoid of a dynamic seal between a managed fluid area of the valve and an environment outside of the valve; a closure member in the housing; a first actuation fluid in pressure communication with the closure member configured to have a motive effect with respect to the closure member in one direction; a second actuation fluid in pressure communication with the closure member configured to have a motive effect with respect to the closure member in another direction; a first element capable of causing a change in the pressure of the first actuation fluid; and a second element capable of causing a change in the pressure of the second actuation fluid.

BRIEF DESCRIPTION OF THE DRAWINGS

Referring now to the drawings wherein like elements are numbered alike in the several Figures:

FIG. 1 is a Thermo-Hydraulically Actuated Process Control Valve disclosed herein in a closed position;

FIG. 2 is the Thermo-Hydraulically Actuated Process Control Valve of FIG. 1 in an open position;

FIG. 3 is a representation of an alternate embodiment of the valve disclosed herein;

FIG. 4 is a representation of another alternate embodiment of the valve disclosed herein;

FIG. 5 is a representation of another embodiment of the valve disclosed herein;

FIG. 6 is a representation of another embodiment of a valve disclosed herein in an closed position;

FIG. 7 is a representation of the embodiment of FIG. 6 disclosed herein in a open position;

DETAILED DESCRIPTION

Figure 8:
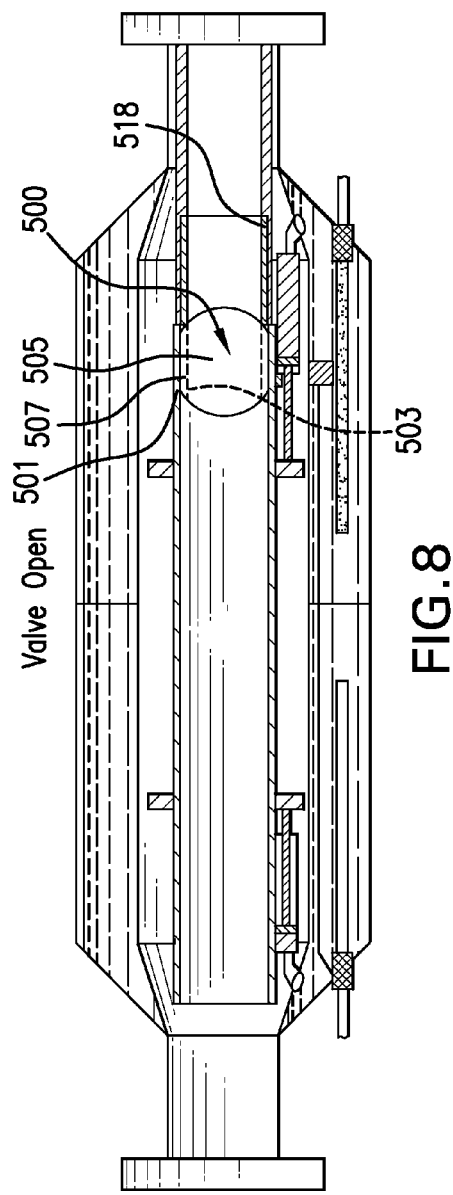
FIG. 8 is a representation of another embodiment of a valve disclosed herein in an open position.

Referring to FIG. 1, a process control valve 10 includes a tubular housing 12 that is connectable in series with other tubular members (not shown) that are a part of an overall fluid management system. Within the housing 12 is a closure member 14 capable of preventing and permitting managed fluid flow though the housing, such as a flapper. The closure member is in communication with a motive force transmitter 15, which is itself in operable communication with an actuation fluid discussed below.

In the embodiment illustrated in FIG. 1, the flapper 14 is pivotable from a closed position to an open position about pivot 16. The pivot 16 is connected to the housing 12 so that a flow tube 18, in the illustrated embodiment will force the flapper 14 open upon stroking of the flow tube 18. A support 20 is schematically illustrated that is interactive with a power spring 22 connected to the flow tube 18 at flange 24. The flow tube when moved to the right of the Figure will cause compression of the spring 22 between the support 20 and the flange 24. The flow tube 18 will also urge the flapper 14 to the open position. If a motive force acting on the flow tube to compress the power spring 22 is withdrawn, the spring will move the flow tube 18 toward the left of the figure and allow a torsion spring (not shown) within the pivot 16 to close the flapper 14. The motive force alluded to is transmitted to the flange 24 via a piston rod 26 that is disposed within a piston cylinder 28 and includes a piston 30. The piston 30 includes a dynamic seal thereabout (not shown) such as a piston ring or set of rings to allow the piston to respond to fluid pressure acting thereon. It will be understood that although a discrete piston is shown, more of these may be employed or an annular piston might be substituted therefor. The other side of the piston 30 is exposed to an actuation fluid 31 that is contained within a sealed chamber 32. In the illustrated embodiment, the chamber is an annular chamber but it is to be understood that any shape is acceptable. The chamber is penetrated, in the embodiment of FIGS. 1 and 3, by a static seal 34 that admits at least one of a heating element 36/136 and/or energy supply conduit 35. It is to be understood that the element or conduit are examples and that other things could also be admitted via the seal 34 as the particular application might require. Note however, in an alternate embodiment illustrated in FIG. 4 that the heating element 236 is disposed entirely outside of the chamber 32 and requires no penetration of the chamber 32. Power and or communication with the element 236 is supplied via line 237 entirely outside of the chamber 32. If a particular embodiment using heating element 236 has no other reason for a penetration of the chamber 32, then no seal 34 would be needed in such embodiment. The embodiment of FIG. 4 otherwise works identically to that of the other embodiments herein including any optional configurations.

It will be appreciated that other things could also be admitted through this seal 34 if desired depending upon what might be necessary or desirable for a particular application. In the illustrated embodiment, also admitted is a communication line 38 connected to a position sensor 40. Because the seal 34 is static in nature, there is no significant possibility of a leak. The seal must suffer no dynamic capability and hence is by definition more reliable.

The position sensor may be a magnetic type or other proximity sensor that allows for a confirmation of the location of the flow tube 18.

For clarity, it is noted that the element 36 in FIG. 1 is a rod type element and the element 136 in FIG. 3 is annular configured. In each case, the element functions to heat the actuation fluid.

In order to increase fluid pressure within chamber 32, the heating element 36/136 is energized and causes the temperature of the actuation fluid such as hydraulic fluid in chamber 32 to increase leading to expansion thereof. The coefficient of thermal expansion of the actuation fluid may be selected (by selection of a suitable fluid or by chemically modifying a fluid to custom tailor the coefficient of thermal expansion of the fluid.) as desired to create the degree of motive force needed for the application. Upon the heating of the fluid in chamber 32, the piston 30 is urged toward the flapper 14 thereby causing the rod 26 to bear against the flange 24 and force the flow tube 18 to move toward the flapper 14 and to push the flapper 14 to the open position as shown in FIG. 2. Cooling of the fluid in chamber 32 will allow the flow tube to return to the position in FIG. 1 pursuant to the power spring 22 urging the flow tube 18 to an unactuated position.

It is to be appreciated that the exact configuration of the invention is not limited to that illustrated in the drawings. Rather, the concept of the invention has broader reach in that it requires a fluid in a chamber that can be heated so that the fluid pressure in the chamber increases whereby the fluid causes the piston that ultimately acts on a flapper or other valve member to open the same. The use of heat and an actuation fluid to provide motive force for the change in position of a valve means that there need be no dynamic seals in the system and hence that there can be no leaks of the managed fluid within the system to the environment.

In one embodiment, it is noted that the actuation fluid 31 is pre pressurized so that the amount of thermal expansion needed for actuation of the valve is less. This of course translates to less needed power for the heating element as the temperature increase necessary in the actuation fluid will be comparatively less due to the preexisting pressurization of the actuation fluid. Such pressurization of the fluid may be accomplished at manufacture of the valve or could be applied on site, but in the latter embodiment a static seal will be required in the chamber. In the event a static seal is already supplied as in the FIG. 1 or 3 embodiments, there is no additional seal required but in the case of FIG. 4, a seal would be needed where one was not before required.

In another embodiment, referring to FIG. 5, the valve is again pre pressurized but also included is a pressure dump configuration 350 so that the valve can be quickly closed. The dumped pressure can be to anywhere that is convenient but in keeping with the concept of having fewer seals (and no dynamic ones) between the managed fluid and atmosphere, the dump may be to a dump chamber 352 having a predetermined lower pressure than the pressure of the actuation fluid. The chamber will itself comprise a valve 354 of some type to admit the pressurized actuation fluid in the event a dump is desired. This may be by way of burst disk, such that increasing the pressure of the actuation fluid will automatically at a predetermined pressure threshold cause the valve to close due to rapid depressurization of the chamber 332. Alternately this may be by way of a remotely controllable valve in the same location 354 such that upon command the valve will open and reduce the actuation fluid pressure by flooding the dump chamber 352. The valve 354 may be externally powered through the seal 334 or may use local power source that does not require a seal 334 and as such would be used in the configuration of FIG. 4.

Regardless of which type of valving method or mechanism is used to admit fluid to the dump chamber 352, immediately upon opening of the chamber, the actuation fluid pressure will drop due to the effectively increased volume of the chamber 332 (volume of 332 plus volume of 352).

Referring again to the FIG. 4 embodiment, it is to be understood that the heating element 236 illustrated therein may be an inductive heating element.

It should be understood that it is possible not only to actuate the closure member to open and closed positions within the embodiments hereof but is also possible to actuate the closure member to any position between open and closed if desired depending upon fluid pressure applied to the piston.

It is further to be understood that there is no requirement that the valve as disclosed herein be of a fail-safe closed design. There is no requirement that the power spring be incorporated at all. In view hereof, an alternative embodiment (see FIGS. 6 and 7) utilizes two configurations of heating elements and volumes to move the flow tube in opposing directions based upon which fluid volume is energized. Reference to FIGS. 6 and 7 will make the concept clear where numerals as disclosed above are retained for one side of the device and four hundred series similar numerals are used to denote the mimicked components that will be positioned to actuate in a direction opposed to the first set of components. More specifically, and with direct reference to FIGS. 6 and 7, a reader having understood the foregoing disclosure will recognize the components numbered on the left side of the Figures. The reader will also understand the four hundred series numbers on the right side of the Figures. It is noted that the fluid volumes 31 and 431 are separate so that thermal input thereto will be substantially restricted to one of the sets of components. Components with four hundred series numerals are introduced below in list form for convenience of the reader: additional actuation fluid volume 431, heating element 436 (note other heating means as described herein are applicable to this embodiment as well as those in which they are illustrated), piston 430/and rod 426. These are configured such that when actuated the components identified provide a motive force to retract the flow tube 418, consequently enabling the closure member 414 to return to the closed position. The functional valve condition (open or closed) in this alternative embodiment will correspond to that actuation fluid volume which has been selectively and exclusively energized.

Figure 9:
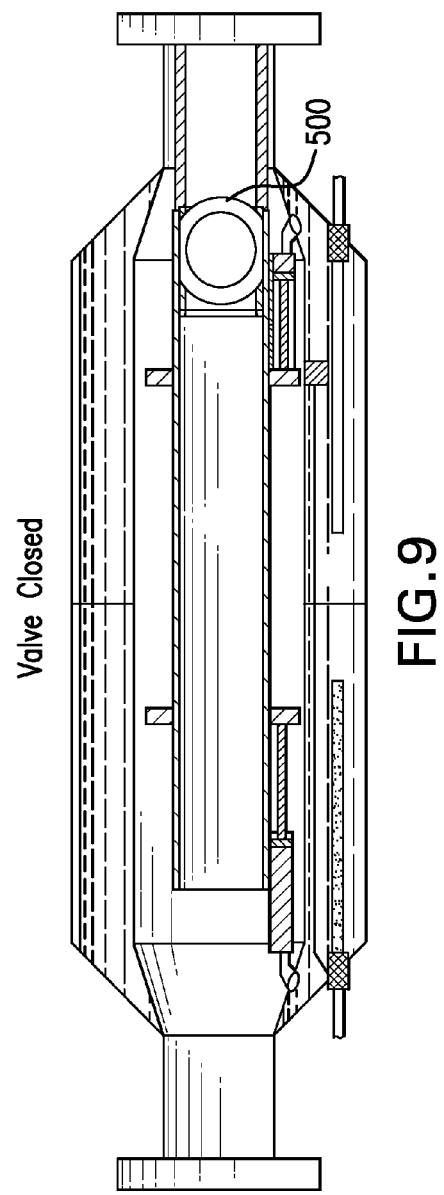
FIG. 9 is a representation of the embodiment of FIG. 8 disclosed herein in a closed position.

Referring to FIGS. 8 and 9, it is easily recognized that the embodiment is similar to the foregoing FIGS. 6 and 7 but the distinction therefrom, i.e. the ball valve in substitution for the flapper is equally employable for any of the other embodiments illustrated herein where a flapper is illustrated. Ball valve 500 is illustrated in an open position in FIG. 8 and a closed position in FIG. 9. The motive force to move the ball valve 500 in one direction or the other is provided by the same components as discussed with respect to FIGS. 6 and 7. In addition, it will be appreciated that either of the sets of components in those figures could be substituted for by a spring configuration such as in FIG. 1. In embodiments where the flapper is substituted by the ball valve 500, the flow tube 518 causes the ball valve to rotate to either a closed position from an open position or an open position from a closed position by means of rotation pins 501 incorporated on the flow tube 518 and grooves 503 on the exterior of the ball 505. Pivot pins 507 are also incorporated on the exterior of the ball 505 at its rotational axis. As the Flow Tube 518 extends and retracts during actuation, the rotation pins 501 engage the exterior grooves 503 on the ball causing the ball to rotate between the open and closed position. The configuration may also incorporate a means of translation of the ball relative to the ball seat, in addition to the rotational action described above.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A thermo-hydraulically actuated valve comprising:
a housing;
a closure member capable of preventing and permitting fluid flow through the housing;
an actuation fluid chamber disposed at the housing and sealed from an external environment, the actuation fluid chamber including a fluid connection to a dump chamber;
a motive force transmitter in force transmissive communication with the closure member, the transmitter being in fluid communication with the actuation fluid chamber; and
a heating element in thermal communication with the actuation fluid chamber,
wherein an area of the valve to be contacted by a managed fluid within the valve is devoid of a dynamic seal in contact with an environment outside of the valve, and wherein, at a pressure threshold of actuation fluid in the actuation fluid chamber, the dump chamber is configured to open to allow rapid depressurization of the actuation fluid chamber.

2. A thermo-hydraulically actuated valve as claimed in claim 1 further comprising:
an actuation fluid pre-pressurized within the actuation fluid chamber in an unactuated position of the closure member, the actuation fluid configured to expand upon increased temperature by the heating element to actuate the closure member.

3. A thermo-hydraulically actuated valve as claimed in claim 2 wherein the actuation fluid is configured to be pre-pressurized via a static seal in the actuation fluid chamber.

4. A thermo-hydraulically actuated valve as claimed in claim 2 wherein a temperature increase of the pre-pressurized actuation fluid needed to actuate the valve is less than a temperature increase needed to actuate the valve with actuation fluid in a non-pre-pressurized condition.

5. A thermo-hydraulically actuated valve as claimed in claim 1 wherein the closure member is a flapper.

6. A thermo-hydraulically actuated valve as claimed in claim 1 wherein the actuation fluid chamber is disposed around the housing.

7. A thermo-hydraulically actuated valve as claimed in claim 1 wherein the actuation fluid chamber includes a static seal for passage of at least a component related to the heating element.

8. A thermo-hydraulically actuated valve as claimed in claim 7 wherein the component is the heating element.

9. A thermo-hydraulically actuated valve as claimed in claim 7 wherein the component is an energy supply conduit for the heating element.

10. A thermo-hydraulically actuated valve as claimed in claim 1 wherein the actuation fluid is hydraulic fluid.

11. A thermo-hydraulically actuated valve as claimed in claim 1 wherein the actuation fluid is a chemically adjusted fluid to produce a desired coefficient of thermal expansion.

12. A thermo-hydraulically actuated valve as claimed in claim 1 wherein the motive force transmitter includes a piston.

13. A thermo-hydraulically actuated valve as claimed in claim 12 wherein the motive force transmitter includes a flow tube.

14. A thermo-hydraulically actuated valve as claimed in claim 1 wherein the heating element is a rod disposed within the actuation fluid chamber.

15. A thermo-hydraulically actuated valve as claimed in claim 1 wherein the heating element is an inductive heating element.

16. A thermo-hydraulically actuated valve as claimed in claim 1 wherein the actuation fluid chamber is disposed around the housing and the dump chamber is disposed at the housing and radially inward of the actuation fluid chamber.

17. A thermo-hydraulically actuated valve as claimed in claim 1, and further comprising;
a first actuation fluid in pressure communication with the closure member configured to have a motive effect with respect to the closure member in one direction;
a second actuation fluid in pressure communication with the closure member configured to have a motive effect with respect to the closure member in another direction;
wherein the heating element includes a first element and a second element, the first element capable of causing a change in the pressure of the first actuation fluid; and
the second element capable of causing a change in the pressure of the second actuation fluid.

18. A thermo-hydraulically actuated valve comprising:
a housing;
a closure member capable of preventing and permitting fluid flow through the housing;
an actuation fluid chamber disposed at the housing and sealed from an external environment, the actuation fluid chamber including a fluid connection to a dump chamber;
a motive force transmitter in force transmissive communication with the closure member, the transmitter being in fluid communication with the actuation fluid chamber; and
a heating element in thermal communication with the actuation fluid chamber,
wherein an area of the valve to be contacted by a managed fluid within the valve is devoid of a dynamic seal in contact with an environment outside of the valve, and wherein the dump chamber is maintained at a pressure lower than a pressure of actuation fluid when actuating.

19. A thermo-hydraulically actuated valve comprising:
a housing;
a closure member capable of preventing and permitting fluid flow through the housing;
an actuation fluid chamber disposed at the housing and sealed from an external environment the actuation fluid chamber including a fluid connection to a dump chamber;

a motive force transmitter in force transmissive communication with the closure member, the transmitter being in fluid communication with the actuation fluid chamber; and a heating element in thermal communication with the actuation fluid chamber, wherein an area of the valve to be contacted by a managed fluid within the valve is devoid of a dynamic seal in contact with an environment outside of the valve, and wherein the dump chamber includes a valving mechanism.

* * * * *